US011104386B2

(12) United States Patent
Kondo

(10) Patent No.: US 11,104,386 B2
(45) Date of Patent: Aug. 31, 2021

(54) TORQUE ROD MOUNTING STRUCTURE

(71) Applicant: HONDA MOTOR CO., LTD., Tokyo (JP)

(72) Inventor: Takehiro Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/617,588

(22) PCT Filed: Mar. 16, 2018

(86) PCT No.: PCT/JP2018/010437
§ 371 (c)(1),
(2) Date: Nov. 27, 2019

(87) PCT Pub. No.: WO2018/220949
PCT Pub. Date: Dec. 6, 2018

(65) Prior Publication Data
US 2020/0108872 A1  Apr. 9, 2020

(30) Foreign Application Priority Data

May 31, 2017 (JP) .............................. JP2017-107409

(51) Int. Cl.
*B62D 25/08* (2006.01)
*B60K 5/12* (2006.01)
*B62D 21/15* (2006.01)

(52) U.S. Cl.
CPC .............. *B62D 25/082* (2013.01); *B60K 5/12* (2013.01); *B62D 25/088* (2013.01);
(Continued)

(58) Field of Classification Search
CPC .. B62D 25/088; B62D 25/082; B62D 21/152; B60G 2204/128; B60K 5/1241; B60Y 2306/01; B60Y 5/12
See application file for complete search history.

(56) References Cited

U.S. PATENT DOCUMENTS 1,946,060 A * 2/1934 Buckendale .......... B60G 5/053
280/680
2,370,211 A * 2/1945 Ulrich ................ B62D 25/2036
296/203.03
(Continued)

FOREIGN PATENT DOCUMENTS

EP       2433850 A1    3/2012
JP     2007514583 A    6/2007
(Continued)

OTHER PUBLICATIONS

A. Fauconnier, JP 2007-514583 English Translation, ip.com (Year: 2007).*
(Continued)

*Primary Examiner* — Karen Beck
(74) *Attorney, Agent, or Firm* — Armstrong Teasdale LLP

(57) ABSTRACT

A support rigidity of a torque rod with respect to a vehicle body is adequately increased. In addition to an upper bracket (52) and a lower bracket (54) for retaining the torque rod (66), the torque rod mounting structure includes a stay bracket (56) attached to the lower bracket (54) and the damper housing (24). The damper housing (24), the lower bracket (54) and the stay bracket (56) jointly form a closed cross section structure (58), and a retaining portion of the lower bracket (54) retaining the rear end (66A) of the torque rod (66) includes a part of the lower bracket (54) forming the closed cross section structure (58).

8 Claims, 6 Drawing Sheets

(52) U.S. Cl.
CPC ...... *B60G 2204/128* (2013.01); *B60K 5/1208* (2013.01); *B60K 5/1241* (2013.01); *B60Y 2306/01* (2013.01); *B62D 21/152* (2013.01)

(56) References Cited

U.S. PATENT DOCUMENTS

| | | | | | |
|---|---|---|---|---|---|
| 2,552,710 | A | * | 5/1951 | Dodson | A01B 33/00 172/79 |
| 2,825,415 | A | * | 3/1958 | Boughner | B60G 5/053 180/24.11 |
| 2,947,025 | A | * | 8/1960 | Campbell | E05D 1/04 16/275 |
| 3,471,165 | A | * | 10/1969 | Raidel | B60G 5/04 280/687 |
| 2019/0168816 | A1 | * | 6/2019 | Kondo | B62D 25/088 |
| 2020/0062315 | A1 | * | 2/2020 | Matsuoka | B62D 25/082 |

FOREIGN PATENT DOCUMENTS

| | | | |
|---|---|---|---|
| JP | 2010064637 | A | 3/2010 |
| JP | 2012071648 | A | 4/2012 |
| JP | 2016052876 | A | 4/2016 |
| WO | 2016120993 | A1 | 8/2016 |
| WO | 2017019584 | A1 | 2/2017 |

OTHER PUBLICATIONS

JPO Decision to Grant a Patent for Japanese Patent Application No. 2019-521969 dated Aug. 4, 2020; 5 pp.
JPO Notice of Reasons for Refusal for Japanese Patent Application No. 2019-521969 dated May 11, 2020; 4 pp.

* cited by examiner

TORQUE ROD MOUNTING STRUCTURE

CROSS-REFERENCE TO RELATED APPLICATIONS

This application is a U.S. National Phase Application of PCT/JP2018/010437, filed Mar. 16, 2018, which claims the benefit of priority to JP Application No. 2017107409, filed May 31, 2017, the contents of which are hereby expressly incorporated by reference in their entirety.

TECHNICAL FIELD

The present invention relates to a torque rod mounting structure, and more particularly to a mounting structure for mounting a torque rod to a vehicle body.

In a vehicle such as an automobile, it is known to use a torque rod that connects the power unit and the vehicle body to each other in order to suppress the vibrations of the power unit that may include an engine or the like. In known mounting structures (Conventional Examples 1 to 3) for mounting a torque rod to the vehicle body, an end of the torque rod is interposed between an upper bracket and a lower bracket attached to a damper housing (strut housing) provided in a front part of the vehicle body for securing the end of the torque rod to the vehicle body. See Patent Documents 1 to 3, for instance.

Conventional Example 1 utilizes a stay bracket attached to the lower bracket and the damper housing, and a closed cross section structure is formed jointly by the damper housing, the lower bracket, and the stay bracket. See Patent Document 1, for instance.

Conventional Example 2 uses a reinforcing bracket having a channel shaped cross section that extends vertically between a front side frame and an upper cross member, and is attached to the damper housing so as to form a closed section structure in cooperation with the damper housing. The upper bracket and the lower bracket are attached to the damper housing and the reinforcing bracket. See Patent Document 2, for instance.

In Conventional Example 3, an upper bracket and a lower bracket are attached to a dash upper front (cross member) which forms a closed cross section structure in cooperation with a strut housing and a dash panel.

PRIOR ART DOCUMENT(S)

Patent Document(s)

Patent Document 1: JP2012-71648A
Patent Document 2: JP2016-52876A
Patent Document 3: WO2016/120993A1

SUMMARY OF THE INVENTION

Task to be Accomplished by the Invention

In Conventional Example 1, since the part of the lower bracket retaining the torque rod located outside of the closed cross section forms a cantilever, the closed cross section structure is ineffective in restricting the vertical deformation of the part of the lower bracket retaining the torque rod. Therefore, the closed cross section structure is unable to adequately increase the vertical support rigidity of the torque rod with respect to the vehicle body.

Conventional Example 2 requires an elongated reinforcing bracket having a channel cross section, and this increases the weight and the cost of the structure. Furthermore, the reinforcing bracket does not effectively contribute to the suppression of the vertical deformation of the part of the upper bracket and the lower bracket retaining the torque rod, and is therefore unable to adequately increase the vertical support rigidity of the torque rod with respect to the vehicle body.

In the structure of Conventional Example 3, the upper bracket and the lower bracket are attached to the dash upper front. This structure does not effectively contribute to the suppression of the vertical deformation of the part of the upper bracket and the lower bracket retaining the torque rod, and is therefore unable to adequately increase the vertical support rigidity of the torque rod with respect to the vehicle body.

In view of such a problem of the prior art, a primary object of the present invention is to adequately increase the vertical support rigidity of the torque rod with respect to the vehicle body.

Means for Accomplishing the Task

To achieve such an object, one embodiment of the present invention provides a mounting structure for a torque rod (66) connecting a power unit (28) and a vehicle body (12) to each other, comprising: an upper bracket (52) and a lower bracket (54) that are fixed to a damper housing (24) forming a part of the vehicle body (12) and interpose one end (66A) of the torque rod (66) therebetween to retain the torque rod (66); and a stay bracket (56) attached to the lower bracket (54) and the damper housing (24); wherein the damper housing (24), the lower bracket (54) and the stay bracket (56) jointly form a closed cross section structure (58), and a retaining portion of the lower bracket (54) retaining the one end (66A) of the torque rod (66) includes a part of the lower bracket (54) forming the closed cross section structure (58).

According to this arrangement, the mounting strength and bending rigidity of the lower bracket (54) with respect to the damper housing (24) are increased. Therefore, the torque rod (66) is enabled to suppress the large vibrations of the power unit (28) in an effective manner without causing any significant deformation of the lower bracket (54).

Preferably, in the above torque rod mounting structure, the upper bracket (52) and the lower bracket (54) extend substantially horizontally from the damper housing (24), and the stay bracket (56) includes a bracket side joining portion (56A) attached to a lower part of the lower bracket (54), a housing side joining portion (56B) attached to the damper housing (24), and a part including a front surface portion (56C) and a side surface portion (56D) defined by a bent ridge line (B) extending between the bracket side joining portion (56A) and the housing side joining portion (56B), and having a substantially L-shaped or V-shaped cross section.

According to this arrangement, the bending rigidity of the stay bracket (56) is improved so that the support rigidity of the torque rod (66) in the vertical direction with respect to the damper housing (24) is increased, and the torque rod (66) is enabled to suppress the large vibrations of the power unit (28) in an effective manner.

Preferably, in the above torque rod mounting structure, joining portions of the damper housing (24) to the upper bracket (52), the lower bracket (54) and the stay bracket (56), a joining portion of the upper bracket (52) to the lower bracket (54), and a joining portion of the lower bracket (54)

to the stay bracket (56) are positioned so as to surround the retaining portion for the one end (66A) of the torque rod (66).

According to this arrangement, the load input from the power unit (28) to the damper housing (24) via the torque rod (66) is distributed in different directions so that even when a large load input is applied to the damper housing (24), the damper housing (24) is prevented from excessively deforming. Thus, the vertical support rigidity of the damper housing (24) in supporting the torque rod (66) is increased, and the torque rod (66) is enabled to suppress the large vibrations of the power unit (28) in an effective manner.

Preferably, in the above torque rod mounting structure, the damper housing (24) is provided with a bead (47) extending from a part thereof forming the closed cross section structure to a joining portion of the housing side joining portion (56B) to the lower bracket (54).

According to this arrangement, the rigidity of the joining portion between the damper housing (24) and the lower bracket (54) is improved so that the material of the damper housing (24) can be reduced in thickness, and the material cost and the weight can be reduced.

Preferably, in the above torque rod mounting structure, the upper bracket (52) includes a substantially horizontal bracket main portion (52C) including a part for retaining the torque rod (66), and an extension piece (52E) extending from a side edge of the bracket main portion (52C) toward the lower bracket (54), an extending end (52F) of the extension piece (52E) being attached to the lower bracket (54).

According to this arrangement, the vertical bending rigidity of the upper bracket (52) is improved so that the vertical support rigidity of the damper housing (24) with respect to the torque rod (66) is increased, and the torque rod (66) is allowed to suppress the large vibrations of the power unit (28) in an effective manner.

Preferably, in the above torque rod mounting structure, a reinforcing plate (45) is attached to a part of the damper housing (24) where at least one of the upper bracket (52) and the lower bracket (54) is attached.

According to this arrangement, even when the material of the damper housing (24) is reduced in thickness, the bending rigidity of the part of the side member (44) to which the mounting portion of the upper bracket (52) is attached can be ensured so that the material cost and the weight can be reduced.

Preferably, the above torque rod mounting structure includes a nut holding bracket (62) attached to the stay bracket (56) to define a nut holding part (60) jointly with the bracket side joining portion (56A), the nut holding part (60) being provided with a floating nut (64) for connecting the one end of the torque rod (66) to a vehicle body side.

According to this arrangement, the load input from the torque rod (66) is distributed from the nut holding bracket (62) to the damper housing (24) so that the support rigidity of the torque rod (66) with respect to the damper housing (24) is increased, and the torque rod (66) is enabled to suppress the large vibrations of the power unit (28) in an effective manner.

Preferably, in the above torque rod mounting structure, another end (66B) of the torque rod (66) is connected to a power unit mounting portion (32) provided on the power unit (28) for securing the power unit (28) to the vehicle body.

According to this arrangement, the vibrations of the power unit (28) transmitted to the power unit mounting portion (32) is blocked from being transmitted to the vehicle body owing to the high rigidity of the torque rod (66) so that the vibrations are prevented from being transmitted to the sheet steel surrounding the cabin.

Effect of the Invention

The torque rod mounting structure of the present invention thus allows the vertical support rigidity of the torque rod with respect to the vehicle body to be adequately increased.

BRIEF DESCRIPTION OF THE DRAWING(S)

MODE(S) FOR CARRYING OUT THE INVENTION

A torque rod mounting structure according to an embodiment of the present invention is described in the following with reference to FIGS. 1 to 6.

Figure 1:
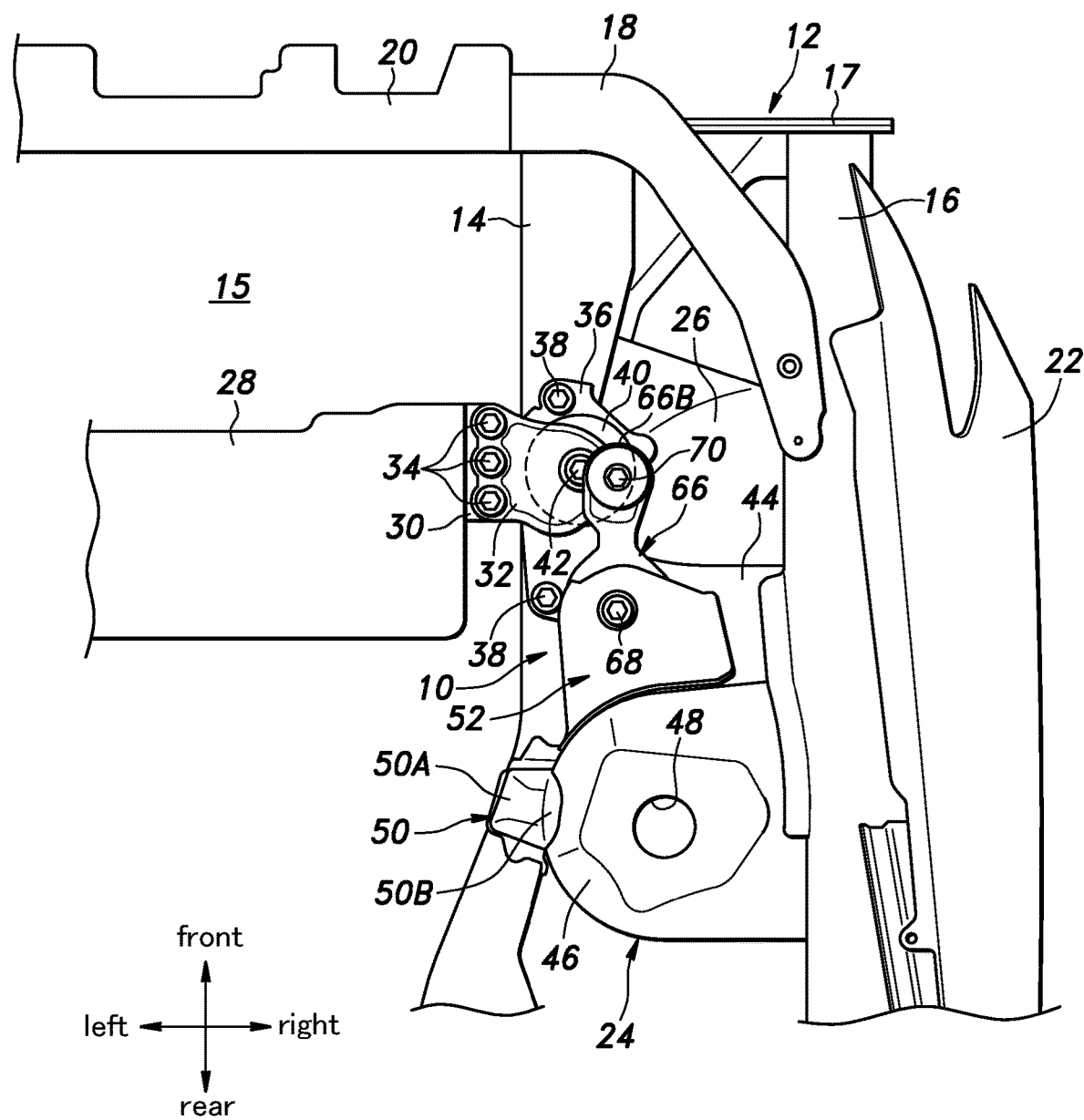
FIG. 1 is a plan view of a vehicle body front part incorporated with a torque rod mounting structure according to an embodiment of the present invention.

As shown in FIG. 1, the torque rod mounting structure 10 of the present embodiment is provided on a vehicle body front part 12 of an automobile.

The vehicle body front part 12 has a pair of front side frames 14 extending in the fore and aft direction on either side of the vehicle body, a pair of upper members 16 also extending in the fore and aft direction, a pair of bulkhead upper side members 18 made of a substantially L shaped steel member and each having an end connected to the corresponding upper member 16, and a bulkhead upper center member 20 made of a laterally extending steel member having the two ends thereof connected to the other ends of the bulkhead upper side members 18, respectively. The front end of each front side frame 14 and the front end of the corresponding upper member 16 are connected to each other by a connecting plate 17.

The vehicle body front part 12 further includes a pair of front fenders 22 made of stamp formed members and attached to the respective upper members 16, and a pair of front damper housings (strut housings) 24 and a pair of front wheel houses 26 which are formed by stamp forming and attached to the respective front side frames 14 and the respective upper members 16.

In FIG. 1, only the front side frame 14, the upper member 16, the bulkhead upper side member 18, the front fender 22, the front damper housing 24, and the front wheel houses 26 located on the right hand side of the vehicle body are illustrated.

In an engine room 15 defined between the left and right front side frames 14, an engine 28 (internal combustion engine) forming a power unit of the vehicle is mounted laterally. A mounting piece 30 is provided in a right end part of the engine 28 with respect to the cylinder row direction. An engine side mounting bracket 32 that forms a power unit mounting portion is fixed to the mounting piece 30 by a plurality of bolts 34. The engine side mounting bracket 32 extends from the mounting piece 30 to a position located above the right front side frame 14. A vehicle body side engine mounting member 36 is fixed by a plurality of bolts 38 to an upper surface portion of the right front side frame 14 which is positioned below the engine side mounting bracket 32. The engine side mounting bracket 32 and the vehicle body side engine mounting member 36 are connected to each other by a bolt 42 via a rubber bush 40. Thereby, the engine 28 is supported by the front side frame 14 with a vibration insulation.

As shown in FIGS. 2 to 5, each front damper housing 24 includes a side member 44 provided with a semi-cylindrical portion 44B extending downward with an arcuate surface and having a U-shaped upper opening edge 44A, and an upper member 46 attached to the upper opening edge 44A of the semi-cylindrical portion 44B and formed with a center hole 48 for mounting a damper. Thereby, the bending rigidity of the side member 44 of the front damper housing 24 in the vertical direction is improved. To the part of the wall surface of the semi-cylindrical portion 44B facing the engine room 15 is attached a reinforcing member 50 extending in the vertical direction. The reinforcing member 50 has a channel shaped cross section so as to form a closed cross section jointly with the side member, and is provided with a lower end (see FIG. 1) attached to the front side frame 14 and an upper end 50B attached to the upper member 46. The reinforcing member 50 increases the vertical bending rigidity of the side member 44 of the front damper housing 24.

The torque rod mounting structure 10 includes an upper bracket 52 and a lower bracket 54 consisting of stamp formed members that are attached to the side member 44 of the right front damper housing 24 in a vertically spaced apart relationship.

The upper bracket 52 is attached to the front surface of the semi-cylindrical portion 44B of the side member 44 via a flange piece 52B (joining part) thereof formed by bending the base end 52A thereof, and extends substantially horizontally forward from the base end 52A so as to form a planar bracket main portion 52C. The bracket main portion 52C is formed with a through hole 52D for attaching a torque rod 66.

The lower bracket 54 is attached to the front surface of the semi-cylindrical portion 44B of the side member 44 by a flange piece (joint part) 54B formed by bending the base end 54A thereof, and extends substantially horizontally forward from the base end 54A so as to form a planar bracket main portion 54C which extends in parallel with the main portion 52C of the upper bracket 52. The bracket main portion 54C is formed with a through hole 54D for attaching the torque rod 66. The through hole 52D and the through hole 54D are aligned with each other in the vertical direction. The lower bracket 54 further includes a leg piece 54E that is bent downward from the right side of the bracket main portion 54C to form an upright wall, and is attached to the front surface of the semi-cylindrical portion 44B at the lower end 54F thereof.

The upper bracket 52 further includes a pair of extension pieces 52E that are bent downward from a left and a right side edge part of the bracket main portion 52C, respectively, and extend toward the lower bracket 54. Each extension piece 52E is attached to the bracket main portion 54C of the lower bracket 54 at the lower end 52F thereof. Thereby, the bending rigidity of the bracket main portion 52C of the upper bracket 52 in the vertical direction is improved.

Figure 5:
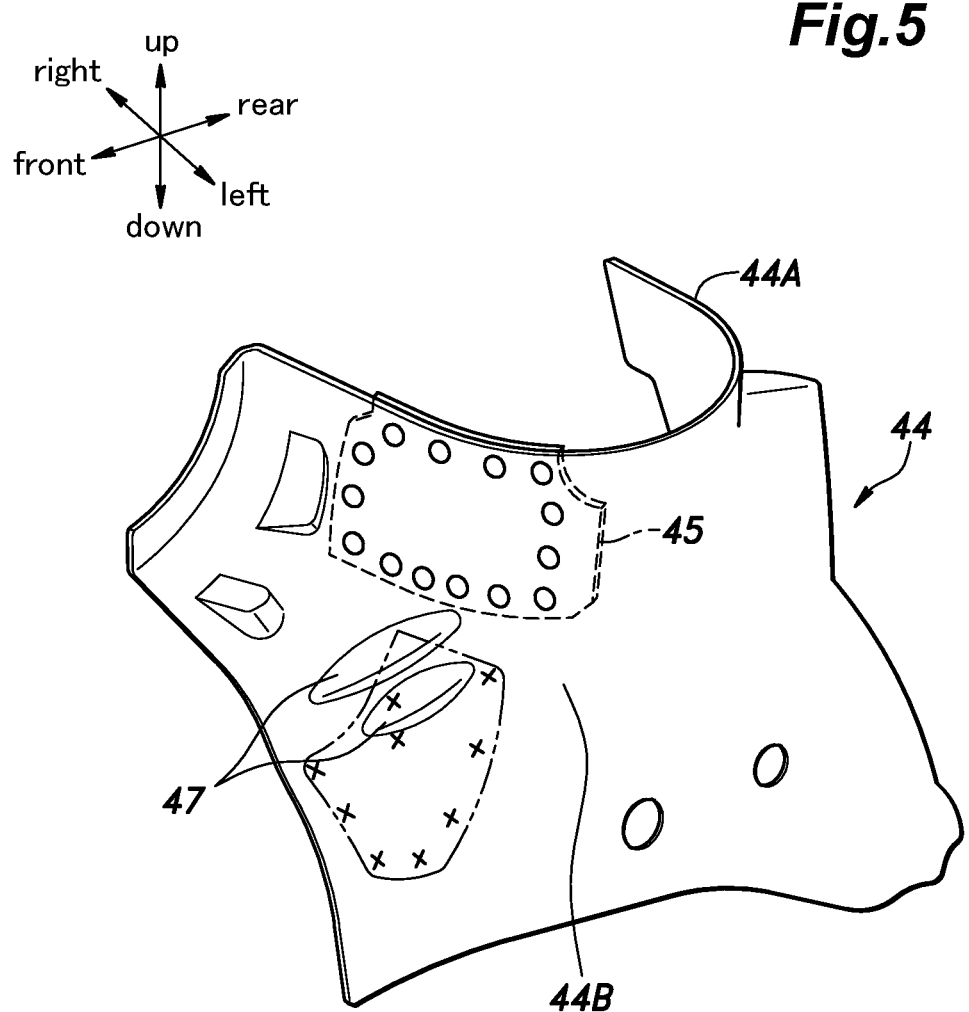
FIG. 5 is a perspective view showing a side member of a damper housing in the torque rod mounting structure.
Figure 6:
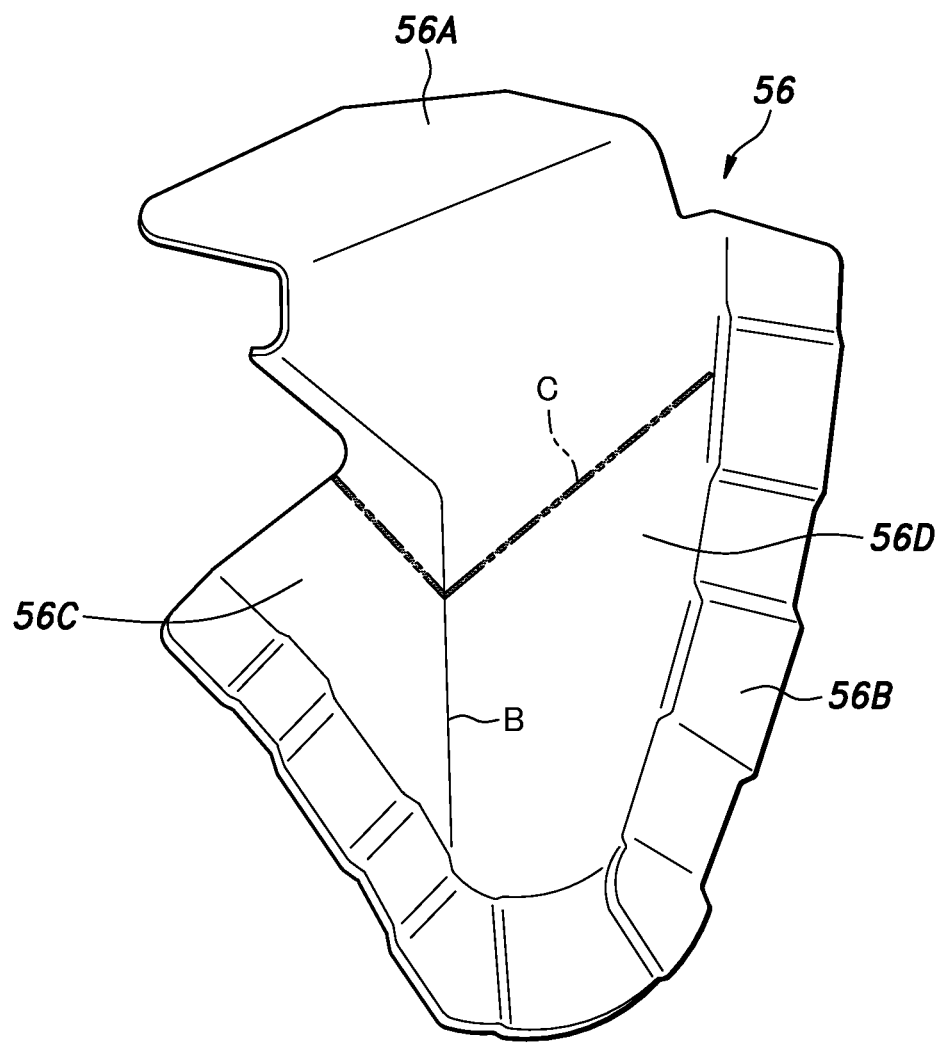
FIG. 6 is a perspective view showing a stay bracket of the torque rod mounting structure.

Small circles "O" in FIG. 5 indicate the welding points at which the flange piece 52B of the upper bracket 52 is attached to the side member 44, and crosses "X" in FIG. 5 indicate the welding points at which the flange piece 54B of the lower bracket 54 is attached to the side member 44. A reinforcing plate 45 is attached to a part of the back surface of the side member 4 corresponding to the flange piece 52B of the upper bracket 52. Thereby, even if the plate thickness of the side member 44 is reduced in order to reduce the material cost and reduce the weight, the bending rigidity of the side member 44 of the mounting portion of the upper bracket 52 can be ensured.

Another reinforcing plate 45 may also be attached to a part of the back surface of the side member 4 corresponding to the flange piece 54B of the lower bracket 54 as indicated by the double-dot chain line. Thereby, even if the plate thickness of the side member 44 is reduced in order to reduce the material cost and reduce the weight, the bending rigidity of the side member 44 of the mounting portion of the lower bracket 54 can be ensured.

A stay bracket 56 made of a stamp formed member is provided under the lower bracket 54. As shown in FIGS. 2 to 4 and 6, the stay bracket 56 includes a bracket side joining piece 56A attached to the lower bottom surface of the bracket main portion 54C of the lower bracket 54, a housing side joining piece 56B attached to the outer surface of the semi-cylindrical portion 44B of the side member 44, and an upright wall extending between the bracket side joining piece 56A and the housing side joining piece 56B and consisting of a front surface portion 56C and a side surface portion 56D which are separated from each other by a vertical bent ridge line B. As shown by the imaginary line C in FIG. 6, the upright wall of the stay bracket 56 has a substantially L-shaped or substantially V-shaped cross section. Owing to this configuration, the bending rigidity of the stay bracket 56 is improved.

Figure 4:
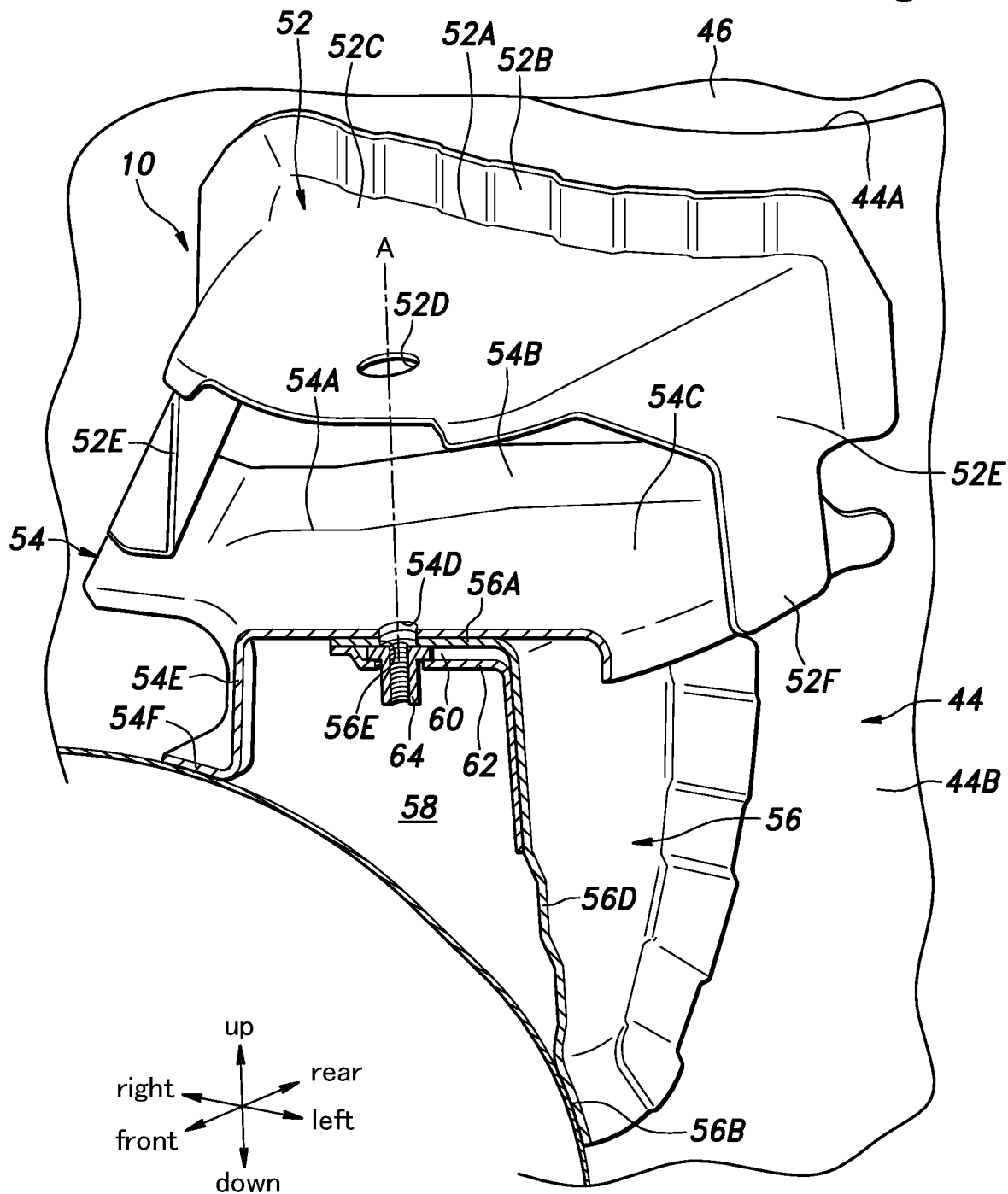
FIG. 4 is a fragmentary sectional view showing the mounting structure for the vehicle body side bracket.

As shown in FIG. 4, the semi-cylindrical portion 44B of the side member 44, the leg pieces 54E of the lower bracket 54, and the stay bracket 56 jointly form a closed cross section structure 58 so that the bending rigidity of the bracket main portion 54C of the lower bracket 54 in the vertical direction is improved.

The side member 44 is provided with beads 47 (see FIG. 5) that extends across a part thereof forming the closed cross section structure 58 and the joining portion for the flange piece 54B of the lower bracket 54. Thereby, the rigidity of the joining portion of the side member 44, particularly the joining portion of the side member 44 with the lower bracket 54, is improved, and the required thickness of the material for the side member 44 can be reduced.

The bracket side joining piece 56A of the stay bracket 56 is formed with a through hole 56E having an axial line A. The through hole 56E as well as the through hole 54D of the lower bracket 54 is provided in a part forming the closed cross section structure 58. A nut holding bracket 62 is attached to the stay bracket 56 so as to form a nut holding portion 60 between the nut holding bracket 62 and the bracket side joining piece 56A. The nut holding portion 60 captivates a floating nut 64 having a default position aligning with the axial line A so as to be moveable within a predetermined range with respect to the lower bracket 54.

In this torque rod mounting structure 10, the rear end (one end) 66A of the torque rod 66 is interposed vertically between the upper bracket 52 and the lower bracket 54, and is retained in position by a mounting bolt 68 (see FIG. 2) that is passed through the through holes 52D, 54D and 56E formed in the upper bracket 52, the lower bracket 54, and the stay bracket 56, respectively, and then through the rear end 68A of the torque rod 66, and is threaded into the floating nut 64.

Figure 2:
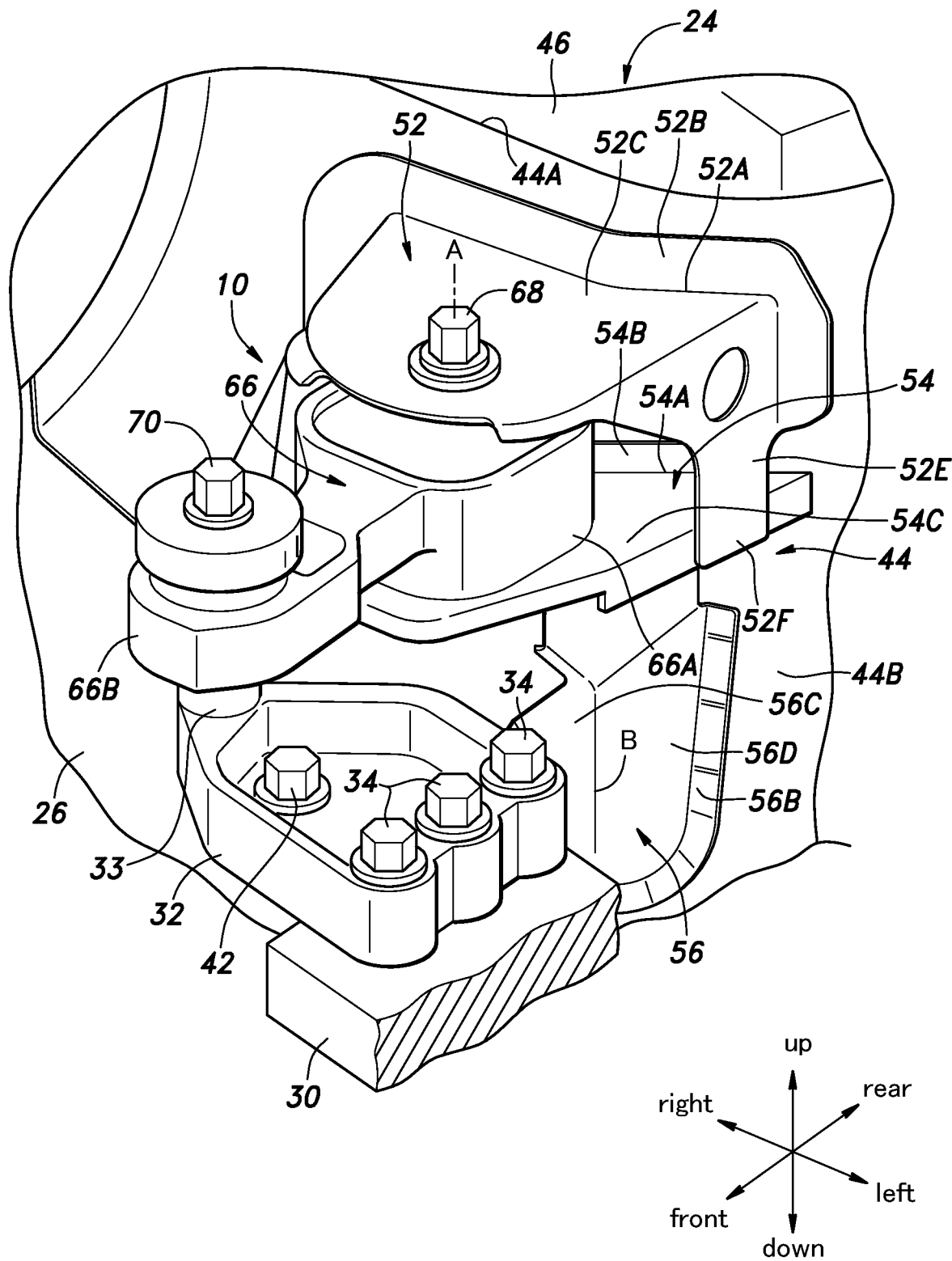
FIG. 2 is a perspective view showing the torque rod mounting structure according to the embodiment.
Figure 3:
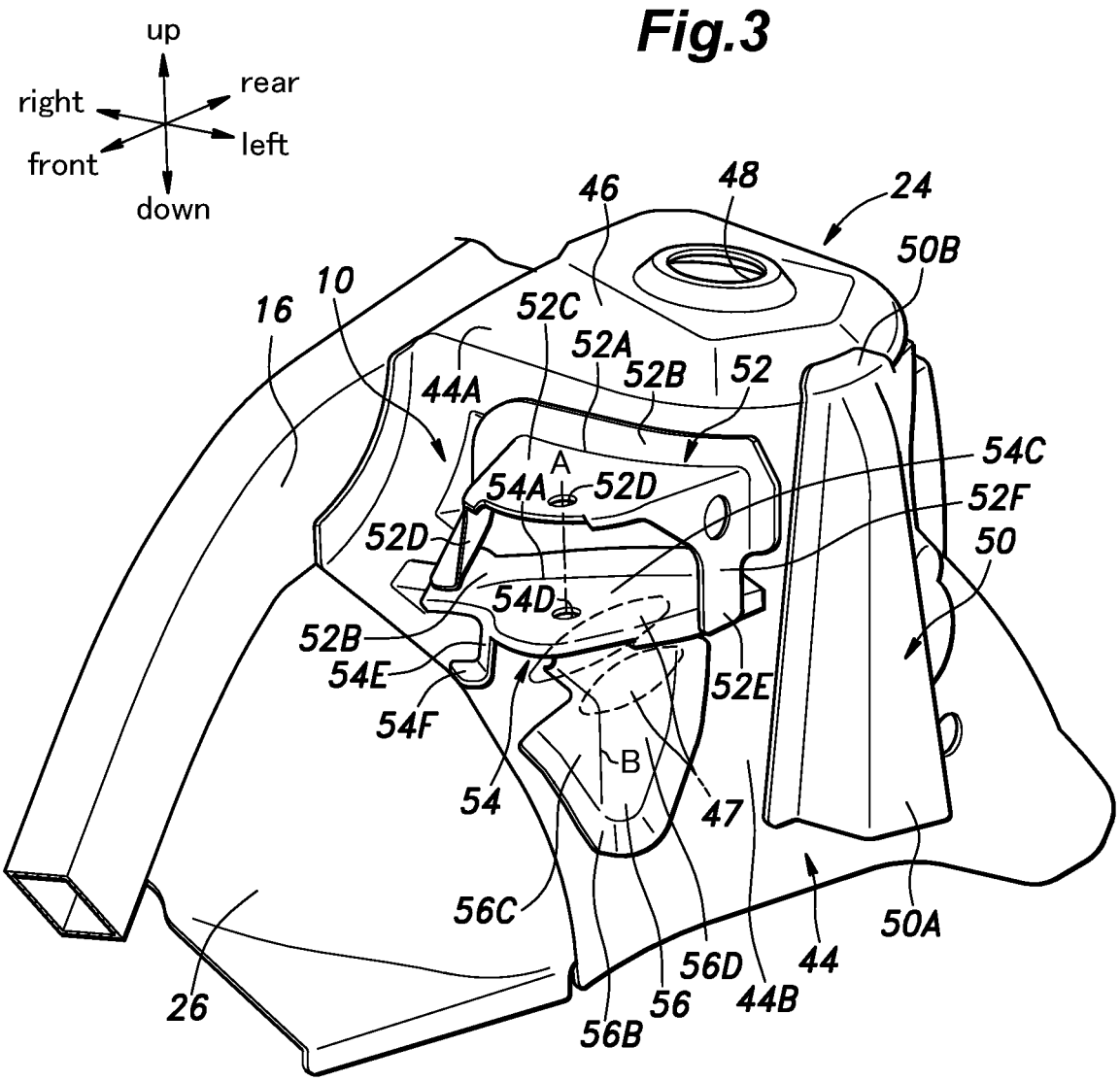
FIG. 3 is a perspective view showing a mounting structure for a vehicle body side bracket of the torque rod mounting structure.

The torque rod 66 is provided with a high rigidity, and extends forward from the torque rod mounting structure 10 as shown in FIGS. 1 and 2. A front end (other end) 66B of the torque rod 66 is fixed to a torque rod fixing portion 33 formed on the engine side mounting bracket 32 by a mounting bolt 70.

According to the above described structure, the holding portion of the rear end 66A of the torque rod 66 with respect to the lower bracket 54 by the mounting bolt 68 and the floating nut 64 is located in a part where the lower bracket 54 forms the closed cross section structure 58 so that the attachment strength and bending rigidity of the lower bracket 54 with respect to the housing 24 are increased. Accordingly, the torque rod 66 is enabled to suppress large vibrations of the engine 28 without causing deformation of the lower bracket 54 in an effective manner.

Since the front end 68B of the torque rod 66 is fixed to the engine side mounting bracket 32, the vibrations of the engine 28 that have been transmitted to the engine side mounting bracket 32 are blocked from being transmitted any further because the torque rod 66 is provided with a high rigidity, and are prevented from being transmitted to the sheet steel of the vehicle body surrounding the cabin.

Owing to the increase in rigidity in various parts of the vehicle body as discussed above, the vertical support rigidity of the rear end 68A of the torque rod 66 is increased so that the torque rod 66 is enabled to effectively suppress the transmission of large vibrations of the engine 28.

Further, the joining portions of the side member 44 of the front damper housing 24 to the upper bracket 52, the lower bracket 54 and the stay bracket 56, the joining portion of the upper bracket 52 to the lower bracket 54, and the joining portion of the lower bracket 54 to the stay bracket 56 are positioned so as to surround the retaining portion of the rear end 66A of the torque rod 66 by the mounting bolt 68 so that a load input from the engine 28 to the front damper housing 24 via the torque rod 66 is distributed widely to the surrounding region. Therefore, even when a large load is applied to the front damper housing 24, the front damper housing 24 is prevented from deforming. Further, since the load input from the torque rod 66 is distributed from the nut holding bracket 62 to the side member 44 of the front damper housing 24, the support rigidity of the torque rod 66 with respect to the front damper housing 24 is increased so that the torque rod 66 is enabled to suppress the transmission of large vibrations of the engine 28 in an effective manner.

Further, the leg pieces 54E connecting the upper bracket 52 and the lower bracket 54 to each other, and the front surface portion 56C and the side surface portion 56D of the stay bracket 56 each form an upright wall, and support the load input mentioned above so that the load input transmitted from the engine 28 to the torque rod mounting structure 10 via the torque rod 66 is efficiently supported.

The present invention has been described above with reference to preferred embodiments thereof, but is not limited by such an embodiments, and can be modified in various ways without departing from the spirit of the present invention. The various elements of the embodiment are not entirely essential for the present invention, but can be omitted as required without departing from the spirit of the present invention.

Glossary of Terms

| | |
|---|---|
| 10: torque rod mounting structure | 12: vehicle body front part |
| 14: front side frame | 15: engine room |
| 16: upper member | 17: connecting plate |
| 18: bulkhead upper side member | 20: bulkhead upper center member |
| 22: front fender | 24: front damper housing |
| 26: front wheel house | 28: engine (power unit) |
| 30: mounting piece | |
| 32: engine side mounting bracket (power unit mounting portion) | |
| 33: torque rod fixing portion | 34: bolt |
| 36: vehicle body side engine mounting member | |
| 38: bolt | 40: rubber bushing |
| 42: bolt | 44: side member |
| 44A: upper opening edge | 44B: semi-cylindrical part |
| 45: reinforcing plate | 46: upper member |
| 47: bead | 48: center hole |
| 50: reinforcing member | 50A: lower end |
| 50B: upper end | 52: upper bracket |
| 52A: base end | 52B: flange piece |
| 52C: bracket main portion | 52D: through hole |
| 52E: extension piece | 52F: lower end |
| 53: reinforcement patch | 54: lower bracket |
| 54A: base end | 54B: flange piece |
| 54C: bracket main portion | 54D: through hole |
| 54E: leg piece | 54F: flange piece |
| 56: stay bracket | |
| 56A: bracket side joining piece (bracket side joining portion) | |
| 56B: housing side joining piece (housing side joining portion) | |
| 56C: front surface portion | 56D: side surface portion |
| 56E: through hole | 58: closed cross section structure |
| 60: nut holding part | 62: nut holding bracket |
| 64: floating nut | 66: torque rod |
| 66A: rear end | 68: mounting bolt |
| 68A: rear end | 70: mounting bolt |
| A: axis | B: bent ridge line |

The invention claimed is:

1. A mounting structure for a torque rod connecting a power unit and a vehicle body to each other, comprising:
   an upper bracket and a lower bracket that are fixed to a damper housing forming a part of the vehicle body and interpose one end of the torque rod therebetween to retain the torque rod; and
   a stay bracket attached to the lower bracket and the damper housing;
   wherein the damper housing, the lower bracket and the stay bracket jointly form a closed cross section structure, and
   a retaining portion of the lower bracket retaining the one end of the torque rod includes a part of the lower bracket forming the closed cross section structure.

2. The mounting structure for the torque rod according to claim 1, wherein
   the upper bracket and the lower bracket extend substantially horizontally from the damper housing, and
   the stay bracket includes a bracket side joining portion attached to a lower part of the lower bracket, a housing side joining portion attached to the damper housing, and a part including a front surface portion and a side surface portion defined by a bent ridge line extending between the bracket side joining portion and the housing side joining portion, and having a substantially L-shaped or V-shaped cross section.

3. The mounting structure for the torque rod according to claim 1, wherein joining portions of the damper housing to the upper bracket, the lower bracket and the stay bracket, a joining portion of the upper bracket to the lower bracket, and a joining portion of the lower bracket to the stay bracket are positioned so as to surround the retaining portion for the one end of the torque rod.

4. The mounting structure for the torque rod according to claim 2, wherein the damper housing is provided with a bead extending from a part thereof forming the closed cross section structure to a joining portion of the housing side joining portion to the lower bracket.

5. The mounting structure for the torque rod according to claim 1, wherein the upper bracket includes a substantially horizontal bracket main portion including a part for retaining the torque rod, and an extension piece extending from a side edge of the bracket main portion toward the lower bracket, an extending end of the extension piece being attached to the lower bracket.

6. The mounting structure for the torque rod according to claim 1, wherein a reinforcing plate is attached to a part of the damper housing where at least one of the upper bracket and the lower bracket is attached.

7. The mounting structure for the torque rod according to claim 2, comprising a nut holding bracket attached to the stay bracket to define a nut holding part jointly with a bracket side joining portion, the nut holding part being provided with a floating nut for connecting the one end of the torque rod to a vehicle body side.

8. The mounting structure for the torque rod according to claim 1, wherein another end of the torque rod is connected to a power unit mounting portion provided on the power unit for securing the power unit to the vehicle body.

* * * * *